Dec. 16, 1930.                R. PRESTON                 1,784,973
                    MILK MEASURING AND SAMPLING MEANS
                          Filed June 6, 1922
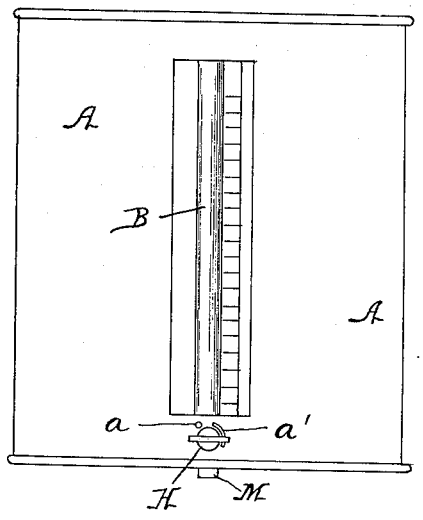
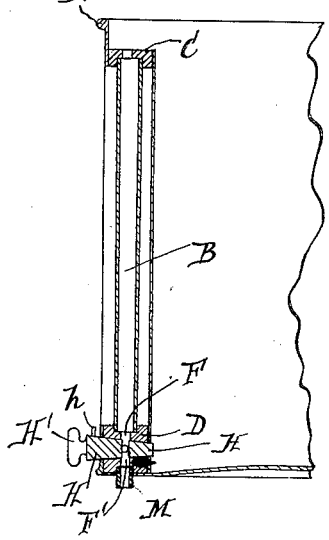
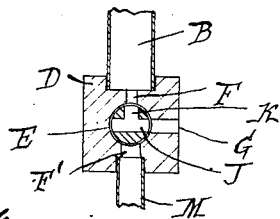
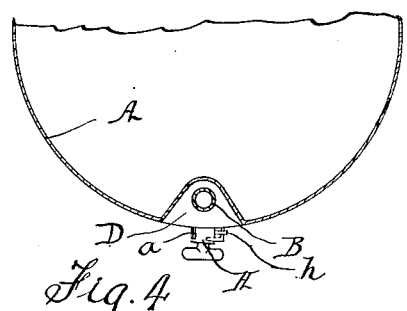
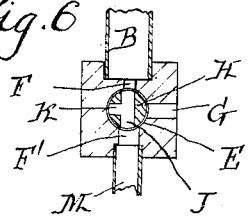
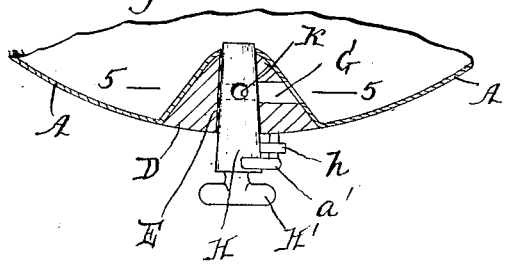
Inventor
Robert Preston
By Pennie, Davis, Marvin & Edmonds
Attorneys Patented Dec. 16, 1930

1,784,973

UNITED STATES PATENT OFFICE

ROBERT PRESTON, OF GISBORNE, NEW ZEALAND

MILK MEASURING AND SAMPLING MEANS

Application filed June 6, 1922, Serial No. 566,320, and in New Zealand July 25, 1921.

This invention relates to any of the well known classes of measuring machines employed in conjunction with cow milking apparatus to measure the amount of milk given by each cow at a milking and also to provide for a sample of each milking being taken from the main quantity for qualitative testing purposes. The invention has particular reference to that class of machine of this nature in which the milk is drawn into or delivered into a measuring vessel having a gauge glass fitted therein to indicate the level of the vessel's contents and the weight or measure thereof in accordance with scale markings arranged upon or adjacent to such gauge glass.

The object of the invention is to provide for the sample to be withdrawn from the milk being measured off in an amount directly proportionate to the main quantity of milk in the vessel, so that each sample taken will bear a proportion to the main quantity that is constant and the different samples taken will very in measurement in direct relation to the variations in the amounts of milk given by the different cows. This is a desirability in carrying out these tests especially when herd culling is being carried on in the milking industry.

The invention consists in the utilization of the gauge glass for the purpose of measuring off and delivering the sample and this is effected by providing the gauge glass fitting with valve means whereby it may be opened up to the vessel so as to fill with the milk to the level of the liquid in the vessel, and may then be cut off therefrom and have its lower end connected to a discharge spout through which the milk in the gauge glass will be emptied into a receptacle placed beneath to receive it.

A maner of carrying out the invention is illustrated in the accompanying drawings, in which:—

Figure 1 is a front elevation of a measuring vessel fitted with the improvements.

Figure 2 is a sectional side elevation of the gauge glass portion thereof.

Figure 3 is a sectional plan thereof.

Figure 4 is a sectional plan of the valve fitting, on an enlarged scale.

Figures 5 and 6 are cross sectional elevations taken on the line 5—5 of Figure 4 and respectively showing the valve in each of its two positions.

A represents the measuring vessel which may be of any of the types well known in this class of appliance and sometimes used under atmospheric conditions and sometimes under vacuum conditions. The wall of the vessel is, at any point, and over a suitable area, perforated in the form of an oblong figure, the major axis of which extends parallel to the vertical axis of the vessel. This perforation is closed or backed-up by a suitable plate of metal extending vertically from the bottom plate of the vessel and bent into a suitable arc joined at its edges with the edges of the perforation in the wall of the vessel, thus forming recesses between the plate and wall of the vessel,—an upper recess near the top of the vessel, and a lower recess between said plate and the side of the vessel at the bottom of the vessel. These recesses are hence adapted to receive and secure blocks C and D constituting them in effect, together with the closing or backing plate referred to, an interrupted formation of the wall of the vessel. Into these blocks C and D is fitted a gauge glass B in such a manner as to lie completely within the indentation formed as above described. The top end of the gauge glass is made to connect with the inside of the vessel through a suitable port opening in block C so that the air conditions in such end shall similarly prevail in the gauge glass to permit of the liquid freely rising therein and flowing therefrom.

In this invention the gauge glass B is connected at its lower end to the lower end of the vessel A by means of the special valve fitting shewn in the drawings. The block D is made with a bore E extending horizontally in from its front and with a port F opening upwards from the bore into the bottom of the gauge glass, a port F' opening downwards opposite thereto and entering a short nipple pipe or spout M, and a port G extending horizontally from the bore at right angles to the bore F, through the block and into the inside of the vessel A. These several ports are disposed in the same circumferential plane about bore E. A valve plug H is provided to fit into such bore and to turn therein, being provided on its outer end with the usual handle H' for turning it. This plug is made with a passage J extending diametrically through it and with a branch passage K extending from this passage at right angles through one half of the plug's diameter. These passages occupy a position coincident with the positions of the ports F, F' and G so that by the turning of the plug in its bore the passages may be made to connect with the ports.

This arrangement of ports and this construction of plug provides therefore that when the plug is turned to cause the branch K to connect with the port F, as in Figure 5, the passage J will connect with the port G so that communication is established between the gauge glass and the bottom of the vessel. When the plug is turned through a quarter of a revolution in one direction a solid portion of the plug will cover the port G so as to cut off the gauge glass from the vessel and the passage J will be brought into coincidence with the ports F and F' and thereby establish communication between the gauge glass and the nipple or spout M, as shewn in Figure 6. Thus in the first position of the plug, the gauge glass will be connected to allow of the liquid rising into it and in the second position it will be disconnected from the vessel, and a discharge opening to the outside will be made with the nipple M.

In a midway position the plug will close both ports F and G so that in the event of it being inconvenient to withdraw the sample measured off into the gauge glass, until after the vessel A has been emptied of the main quantity, such sample may be left confined within the glass and then withdrawn at convenience.

The plug, is designed to be limited in its rotation within the amount necessary to make the two connections before described and for this purpose, its outer end has a pin $h$ projecting radially from it and the face of the vessel A is provided with a peg $a$ projecting from it in the line of the pin's movement and also with a curved guide $a'$ behind which the pin $h$ moves during the major portion of its movement. The one end of this guide is disposed at a distance from the peg $a$ such as to leave just sufficient space for the passing of the pin between them. The other end of the guide is connected to the vessel A so as to provide a stop for the pin. Thus the plug is free to move between the stops provided, while the engagement of the pin behind the guide will serve to hold the plug in its bore during such movement. When the plug is to be removed for cleansing purposes, it is turned to bring the pin opposite the opening in the guide, when it may be drawn straight out from the bore.

It will be readily understood that the manner of carrying out the purposes of this invention may be varied as to the details of construction of the valve fittings without in any way departing from the main features of the invention. These details will naturally vary with different shapes and types of measuring vessels but the same general features under which the gauge glass is connected with the vessel, the connection cut off and a connection made between the glass and a discharge opening, will be maintained throughout.

I claim:

1. In a liquid measuring appliance the combination comprising a measuring vessel having a vertical indentation in the side of the vessel, blocks at the upper and lower ends in the indentation, a vertical gauge glass in said indentation communicating at its upper end with the interior of said vessel making an air tight connection between the upper and lower blocks, said lower block having a main bore and passages leading therefrom to the bottom of the gauge glass and the interior and exterior of the measuring vessel, said passages being in the same vertical plane, and a three way valve plug having openings for registering with said passages and adapted to connect the gauge with either the inside or outside of the vessel.

2. In liquid measuring appliances, in combination, a measuring vessel having a vertical indentation in the side of the vessel, a vertically extending backing-plate joined to the side edges of said indentation and to the bottom of said vessel, a block secured between the wall of the vessel and between the upper end of said backing-plate, a gauge glass lying in said indentation and having its upper end fitted into said block, said block having a port therein providing communication between said gauge glass and the interior of said vessel, another block secured between said wall and the lower end of said backing-plate, said block being adapted to receive the lower end of said gauge glass said lower block having a bore formed to extend through it, and port passages opening from the bore respectively upwards into the bottom of gauge glass, downwards outside the vessel and sidewards into the inside of the vessel, and a valve plug fitted into said bore and formed with passages through it designed and so positioned as to connect the side port with the upwardly extending port when the plug is in one position, and to close the side port and to connect the upwardly and downwardly extending ports, when in a second position, substantially as and for the purposes set forth.

3. In liquid measuring appliances, in combination, a measuring vessel having a vertical indentation in the side thereof, a gauge glass lying in said indentation and communicating at its upper end with the inside of the vessel and connecting at its lower end with the interior of the vessel, a valve block at the lower end of said gauge glass, said block having a main bore and passages leading therefrom to the bottom of the gauge glass and the interior and exterior of the measuring vessel, and a three-way valve plug disposed in said bore and adapted to be operated from the outside of the vessel to provide in one of two positions for the connection of the lower end of the gauge glass with the lower end of the vessel, and in the other such positions, to close such connection and establish connection between the gauge glass and the passage leading to the exterior of the vessel.

In testimony whereof, I affix my signature.

ROBERT PRESTON.